Figure 1:
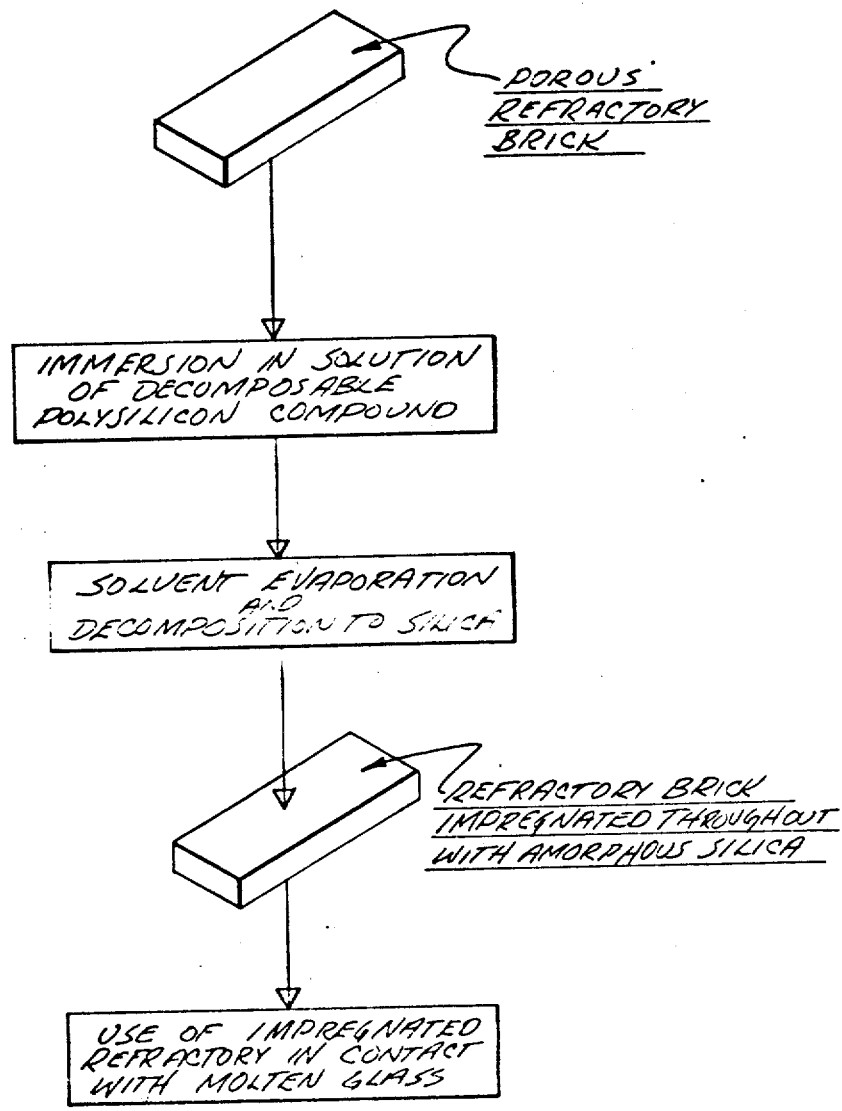

United States Patent [19]
Yoldas

[11] 3,816,163

[45]*June 11, 1974

[54] REFRACTORY ARTICLE AND METHOD FOR PRODUCING SAME

[75] Inventor: Bulent E. Yoldas, Toledo, Ohio

[73] Assignee: Owens-Illinois, Inc., Toledo, Ohio

[ * ] Notice: The portion of the term of this patent subsequent to Aug. 1, 1989, has been disclaimed.

[22] Filed: Dec. 15, 1971

[21] Appl. No.: 208,493

Related U.S. Application Data

[62] Division of Ser. No. 878,106, Nov. 19, 1969, Pat. No. 3,681,113.

[52] U.S. Cl............... 117/46 FA, 65/324, 65/374, 106/38.3, 106/38.35, 106/69, 117/123 A, 117/169 A, 264/30

[51] Int. Cl............................................. C03c 25/00

[58] Field of Search............. 65/324, 374; 106/38.3, 106/38.35, 69; 117/123 A, 169 A, 46 FA; 264/30, 60, 63

[56] References Cited
UNITED STATES PATENTS

| | | | |
|---|---|---|---|
| 2,792,214 | 5/1957 | Eusner et al...................... | 264/60 X |
| 2,799,693 | 7/1957 | Dodgson.......................... | 106/69 X |
| 3,083,111 | 3/1963 | Nickerson........................ | 264/30 X |
| 3,110,601 | 11/1963 | Emblem et al....................... | 106/55 |
| 3,146,252 | 8/1964 | Emblem et al................... | 106/38.35 |
| 3,226,784 | 1/1966 | Owen et al...................... | 117/123 X |
| 3,236,665 | 2/1966 | King................................. | 264/30 X |
| 3,270,382 | 9/1966 | Emblem et al............... | 106/38.35 X |
| 3,292,220 | 12/1966 | Emblem et al............... | 106/38.35 X |
| 3,681,113 | 8/1972 | Yoldas............................ | 117/123 X |

Primary Examiner—William D. Martin
Assistant Examiner—M. R. Lusignan
Attorney, Agent, or Firm—Robert F. Rywalski; Edward J. Holler; Richard D. Heberling

[57] ABSTRACT

Impregnated refractory structures, such as, for example, bricks which have increased resistance to the destructive action of molten glass are disclosed. The structures are produced by an impregnation and densification process in which conventional, prefabricated, solid, porous, refractory structures are first treated with a solution of a polysilicon compound which is thermally decomposable to silica, and the solution-treated structure is then heat treated, to cause a deposition of amorphous silica in the brick pores. Because of the silica deposition and pore impregnation, a densification and decrease in porosity is effected which greatly decreased molten glass penetration and internal destruction of the silica impregnated refractory structure. The use of these impregnated structures also produce a glass with substantially fewer seeds. A particularly suitable polysilicon compound which may be employed is a hydrolyzed and condensed ethyl silicate.

5 Claims, No Drawings

REFRACTORY ARTICLE AND METHOD FOR PRODUCING SAME

This is a division of application Ser. No. 878,106, filed Nov. 19, 1969, now U.S. Pat. No. 3,681,113.

THE INVENTION

The present invention relates to refractory structures, and more particularly to impregnated refractory structures having improved resistance to the erosive and corrosive action of molten glass. Still more particularly, the invention relates to low porosity, densified refractory bricks which are resistant to the destructive action of molten glass compositions.

Various prefabricated refractory structures, for example, bricks, because of their many desirable properties, particularly their high melting points and rigidity and strength at high temperatures, are extensively employed in the metallurgical and glass industries. In the glass industry, for example, these bricks may typically take the form of integral components of the wall and floor structures of the glass melting tank and, as such, are in contact with the molten glass compositions or molten devitrifiable compositions. Unfortunately, notwitstanding their many desirable properties, even the best refractory bricks for a specific application are subject to a deficiency in that their useful, effective life spans are undesirably low. That is, because of the corrosive and erosive action of the molten glass, the desirable properties of the refractory bricks soon deteriorate which requires the melting operation to be discontinued for purposes of allowing brick replacement. Thus, those skilled in the art realize that if the problem of refractory brick deterioration could be eliminated, or at least greatly minimized, the solution to the problem would find great acceptance in the glass industry because of the economic benefits which would result.

It has now been found that apparently the microstructure of the pores of the prior art bricks is a substantial and material factor in detrimentally influencing their effective life. That is, the prior art bricks are of a relatively high porosity characterized by large pore size and also by an inter-communication of the various pores. Apparently, because of these types of pores, molten glass has been capable of penetrating the refractory brick and progressively increasing the size of the pores, hence causing brick internal destruction by corrosive and erosive action as well as the expected external destruction.

Another deficiency of the prior art porous refractory structures is their tendency for bleeding, or outgassing, with a consequent seed formation in the molten glass. Thus, those skilled in the art will readily appreciate that higher quality glass will be produced if bleeding is minimized since the seed content of the glass will be greatly reduced.

With the foregoing in mind, it is an object of this invention to provide for refractory structures having improved useful lives.

It is another object of this invention to provide (1) methods of increasing the resistance of prior art refractory structures to the corrosive and erosive action of molten materials and (2) improved refractory structures.

It is another object of this invention to alter the microstructure of the pores of prior art refractory bricks so as to minimize molten glass penetration.

It is another object of this invention to decrease the porosity of prior art refractory bricks.

Yet another object of this invention is to minimize the pore size of prior art refractory bricks.

Yet another object of the present invention is to provide a refractory brick having minimal pore inter-communication.

Yet another object of this invention is to provide a densified, low-porosity silica-containing refractory brick having improved corrosion and erosion resistance to molten glass.

A still further object of this invention is to provide a method for treating prior art porous refractory structures to increase their resistance to deterioration in the presence of molten glass.

Yet another object of this invention is to provide a method for densifying prior art refractory bricks and for decreasing the porosity thereof.

Yet another object of this invention is to provide refractory bricks having good resistance to internal penetration of molten glass.

A still further object is to provide for refractory structures having a minimum tendency for bleeding.

A further object is to provide for a refractory brick which has amorphous silica impregnated throughout its entire thickness and wherein the silica is deposited from a solution without leaving any residual carbon.

According to one aspect of this invention, the foregoing objects and others are accomplished by introducing a substantially gel-free solution of a hydrolyzed and partially condensed silicon-containing polymer (polysilicon compound) which is decomposable to pure silica into the pores of a solid, porous refractory structure, such as a crucible or refractory brick, and then decomposing the condensed polymer, preferably by firing, so as to homogeneously deposit and impregnate the refractory throughout its entire thickness with amorphous silica. According to the preferred practice of this invention, decomposition will be effected without the concurrent deposition of carbon.

In FIG. 1 of the drawings, there is a schematic flow diagram illustrating the present invention. As will be apparent from the drawing, a solid, porous, refractory brick of the type commonly employed in fabricating glass melting furnaces, is immersed in a solution of a polysilicon compound which is decomposable to silica. The solvent of the solution is then evaporated and the polysilicon compound decomposed. This decomposition effects a deposition of silica in the pores, throughout the entire thickness of the brick. The silica impregnated brick will have improved molten glass resistance, thus making it of great use in the melting furnace of a glass manufacturing operation.

Advantageously, the condensed silicon-containing polymers, or polysilicon compounds, suitable for use in this invention will be of the well known siloxane type in which the silicon atoms are only bonded to oxygen atoms, that is, the polysilicon compound will generally be void of any direct silicon to carbon linkages. Generally, tetrafunctional silanes are hydrolyzed and condensed to produce this type of polysilicon compound. Most typically, these polysilicon compounds are produced by hydrolyzing and condensing tetrafunctional silanes of the formula $Si-X_4$, wherein X is a hydrolyzable group such as a halide, for example, chlorine, or an OR group in which R is a straight or branched chain alkyl or aryl containing one to eight carbon atoms, including octyl, butyl, ethyl, isopropyl, phenyl and the like, for a sufficient amount of time to produce a partially condensed polysilicon which is decomposable to silica and in which the silicon atoms are only bonded to oxygen.

Exemplary of this type of polysilicon compound are the well known hydrolyzed and condensed ethyl silicate polymers which are conveniently prepared by reacting silicon tetrahalides, for example, silicon tetrachloride and ethyl alcohol and then hydrolyzing and condensing the ethyl orthosilicate reaction product. These polymers are generally designated by their equivalent silica ($SiO_2$) content and are commercially available. The silica equivalent of tetraethoxysilane is about 28.8 percent and, because of the hydrolysis and condensation of this material, condensed ethyl silicate polymers will have silica equivalents which exceed this value. Thus, condensed ethyl silicate or condensed ethyl silicate polymers are readily available which have equivalent silica contents of up to 40 percent. If desired, polymers having silica contents of up to about 56 percent may be prepared in the manner set forth in U.S. Pat. No. 2,799,693. Any of these known and available condensed ethyl silicate polymers may be advantageously employed in practicing this invention by forming a substantially gel-free solution of same in a suitable inert organic solvent. Preferably, the solution concentration will be less than 40 percent by weight of equivalent $SiO_2$ and, most desirably, will be about 30–40%.

Highly useful polysilicon compounds, suitable for practicing this invention, are synthesized by reacting a single phase mixture of (1) an alkyl or aryl orthosilicate represented by the structural formula

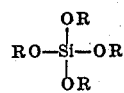

wherein R is an aryl or alkyl group containing from 1–8 carbon atoms, (2) water, and (3) a mineral acid in the presence of a suitable solvent for a sufficient period of time until the reaction is essentially complete and produces a generally gel-free solution of a hydrolyzed condensed polysilicon compound which is decomposable to pure silica and in which the silicon atoms are only bonded to oxygen atoms. While an equivalent reaction is obtainable at reaction temperatures between about room temperature and reflux, it is preferred to react the materials at the reflux temperature or at least at a temperature of from about 75°C – 80° C. to reflux. Below these reaction temperatures, the rate of the reaction is somewhat longer and therefore requires a somewhat longer time for completion which may be as much as 1 day to 3 or 4 days, or more. If run at room temperature, the reaction will result in an exotherm and, after the reaction is essentially complete, the temperature of the resulting reacted solution will decrease. When run under reflux conditions, the reaction time may in general be about one-half hour to sixteen hours, with a preferred reflux reacton time of about two to four hours.

In the above formula, it will be understood that the R groups may be the same or different and that mixtures of compounds having that formula may be employed. Representative, but non-limiting examples of the preferred compounds of the formula (R—O)$_4$Si include methyl orthosilicate, n-propyl orthosilicate, isopropyl orthosilicate, n-butyl orthosilicate, pentylorthosilicate, hexylorthosilicate, octyl orthosilicate, phenyl orthosilicate, benzyl orthosilicate, and the like. Most desirably, however, the compound will be ethyl orthosilicate.

The reaction to produce the preferred condensed polysilicon compound described above from organosilanes will advantageously be practiced by employing a molar ratio of water to the starting compound of the formula (RO)$_4$Si of about 0.5:1 to about 7 or 8:1 and preferably from about 1:1 to about 7 or 8:1. Additionally, while various mineral acids may be employed to catalyze the reaction, HCl in an amount of about 2-3 to about 320 parts of the acid per million parts of total water and total orthosilicate is highly preferred for purposes of maintaining a controlled reproducible reaction. Since the commercially available starting compounds of the formula Si—X$_4$ generally contain acidic or basic impurities, it is desirable, for purposes of being able to maintain the proper acidity, that these compounds be purified prior to the reaction. One suitable way to accomplish this purification is to distill the Si—X$_4$ compound over all alkali-metal aluminum hydride, for example, sodium, potassium or lithium aluminum hydride, according to methods well known in the art.

The solvent employed will generally have several properties. That is, it will be miscible with both water and silicate in order that a single phase system is formed, it will be inert to dilute acid, water and silicates, and will act as a solvent for lower molecular weight polysilicon compounds which are formed during the reaction. Additionally, the solvent will preferably be of a relatively high vapor pressure, and an accordingly low boiling point so that, when the reaction is done under reflux conditions, the reflux temperature will be such as to permit the reaction to proceed at a reasonable rate. Similarly, the high vapor pressure will facilitate later solvent removal. Included among the suitable solvents are methanol, ethanol, n-propanol, iso-propanol, butanol, high alcohols, other polar organic solvents, and mixtures thereof. The preferred solvents are alkyl alcohols having one to six carbon atoms. When other than an anhydrous solvent is used, the quantity of water included with the solvent will be included in the calculation of required water for the reaction. When commercially available polysilicon compounds are employed, these same materials may be used as the solvent.

A particularly suitable polysilicon compound for use in this invention is a hydrolyzed and condensed ethyl silicate polymer produced by (a) heating a mixture of (1) ethyl orthosilicate, (2) water, wherein the molar ratio of water to orthosilicate is in the range of about 1.5:1 to about 2.25:1 and (3) from about 2.7 to 320 parts per million of a mineral acid in the presence of a sufficient amount of a lower alcohol solvent such as ethanol n-propanol, isopropanol, n-hexanol, or the like, and then refluxing the mixture for about two to four hours, thereby forming a gel-free solution containing a partially condensed polysilicon compound, and (b) concentrating the solution by heating at about at least 10° C. to 20° C. below the gel point thereof to volatilize and remove some alkanol byproduct and water. It has generally been found that an amount of anhydrous solvent of about 60 to about 70 percent by weight of orthosilicate compound is sufficient for the reaction mixture.

In general, the concentrating step noted above will effect a removal of a sufficient amount of alcohol by-product and water so that the solution remaining is still gel-free and has a concentration of approximately 30 to 40 percent, and preferably 30–35 percent, by weight of equivalent silica ($SiO_2$). While solutions outside of the 30 to 40 percent range may be employed, it is generally found that when the concentration is in excess of 40 percent, the solution may be too viscous, may have a tendency to gel. Consequently, by using a solution having a concentration below about 40 percent equivalent silica, these deficiencies are generally obviated. Similarly, the lower, or 30 percent concentration limit set forth above is generally a practical limitation. That is, below this limit, the solution is in effect too dilute in equivalent silica and thus several treatments may be required to obtain the desired densification and pore reduction, whereas the number of treatments is significantly less with a higher concentration.

The concentrating step according to usual procedures will involve volatilizing approximately 40 to 60 percent of the weight of the solution remaining after the reflux period and, more typically, approximately fifty weight percent. These weights also generally correspond to the volume which is removed. It should be mentioned, however, that the concentrating step will not be of such intensity as to effect a precipitation or gelation of the partially condensed reaction product held in solution.

After preparing the gel-free solution of the polysilicon compound which is decomposable to silica, this solution is introduced into the pores of a solid, porous, refractory structure by well known methods. This may, for example, be accomplished by immersing the refractory structure into the solution and allowing it to soak for a sufficient time to become saturated therewith. The immersion may be done in vacuum or under normal atmospheric pressure. Optionally, this introduction of the solution may be accomplished by spraying the refractory structure until it has become saturated.

After the refractory structure has had the solution of a polysilicon compound which is decomposable to silica introduced into its pores, the solvent from this solution is allowed to evaporate and the polysilicon compound remaining in the pores then decomposed to silica, hence producing a silica impregnated refractory structure. This decomposition and impregnation effects a densification of the refractory structure and both a reduction in the pore size of the refractory as well as a blocking of the prior pore intercommunication, the net result of which is to greatly decrease the ability of corrosive molten refractory-destroying materials to internally penetrate the refractory and cause its destruction. In passing, it should be mentioned, however, that a single treatment, that is, the steps of introducing the solution into the pores, followed by a decomposition to silica, may not produce the desired degree of densification and porosity decrease. In this case, several successive treatments may be employed to obtain the desired result. Typically, three or four treatments are quite sufficient.

In the usual practice total decomposition of the decomposable polysilicon compound is advantageously effected by heating the refractory structure to a temperature of at least about 500° to about 550° C. for at least about two to four hours. Of course, those skilled in the art will readily appreciate that the time for decomposition will vary depending on the size of the refractory structure being employed. This decomposition may be effected in an oxidizing atmosphere, a reducing atmosphere, or in a nonredox atmosphere. Thus, thermal decomposition in atmospheres of air, oxygen, nitrogen, carbon dioxide, argon, and the like may be employed.

Since, most typically, the refractory structures which are treated and silica-impregnated in accordance with this invention, will be refractory bricks ultimately intended for use as components of the wall or floor portions of a melting furnace, the invention will advantageously be practiced by finally decomposing the decomposable polysilicon compound while the bricks are integral components of such floors or walls. That is, these bricks may be used to construct the walls or floors while they still have a residue of the undecomposed, decomposable polysilicon compound in their pores and the final decomposition effected during the melting furnace heat-up. When a single treatment is employed, the bricks will be saturated with the solution containing a polysilicon compound which is decomposable to silica and the solvent evaporated to deposit the decomposable compound in the pores; after this, the bricks may be used to construct the walls or floor of the furnace or to line the furnace and the compound decomposed to silica when the furnace is fired. If several treatments of the brick are employed, it is advantageous to decompose the polysilicon compound to silica before again introducing the solution of the polysilicon compound into the remaining pores. Consequently, when several treatments are involved, each treatment except the last will include decomposition to silica with the decomposition of only the final treatment being done during furnace heat-up. In this latter case, it will be readily apparent that the bricks which are employed to fabricate the furnace walls or floor will be impregnated with silica, this being the result of the prior treatment, and the pores of the brick will, in addition, contain a polysilicon compound which is yet to be decomposed. In the former case, which is a single treatment, the bricks will only be impregnated with the yet to be decomposed, decomposable polysilicon compound.

It has been surprisingly found that the polysilicon compound may be decomposed to deposit amorphous silica in the refractory pores without the concurrent formation of carbon, if a certain heat history is avoided. Generally, if during the heating of the refractory structure to decompose the polysilicon compound to silica the polysilicon compound is subjected to a temperature of about 160° C. to about 220° C. for a period of time which exceeds about one to two days, it will be difficult to prevent the concurrent formation of carbon during the decomposition. Consequently, when it is desired to prevent carbon formation, as it will be in many instances in the manufacture of glass because of the undesired discoloration thereof, as well as because of a setting up of undesirable electrochemical reactions, this temperature history should be avoided.

It has also been found that during decomposition of the polysilicon compound to silica by the heating of the refractory structure, there is a slight tendency for this structure to crack. This deficiency apparently results from the emission of a substantial volume of gases during the decomposition and in order to accommodate this, it is desirable to allow a holding period during heating to permit a slow emission of these vapors. In general, this tendency for cracking may be greatly minimized by a controlled heat treatment in which the refractory structure and the polysilicon compound are held at a temperature of about 300° C. to about 375° C. for a sufficient time to prevent cracking, e.g., at least about 3 to 4 hours, after which time the structure is heated to at least 500° C. to 550° C. to effect total decomposition. Of course, it will be readily apparent that the heating to effect total decomposition may immediately follow holding the structure at the 300°C. to 375° C. temperature level or, if more convenient, the structure may be cooled to room temperature after the 300° C. to 375° C. hold period and then again reheated to a temperature in excess of about 500° C.

Thus, according to a highly preferred aspect of this invention, the refractory structure which has been impregnated with the decomposable polysilicon compound, will be heated to about 300° C. to 375° C. without holding the structure at a temperature of about 160° C. to 220° C. for a time to exceed about one day, thereby greatly decreasing the possibility of ultimate carbon formation, and held at the 300° C. to 375° C. temperature level for at least about three to four hours, thereby greatly decreasing the likelihood of cracking, and then finally heated to a temperature of about 500° C. to 550° C. or higher for a sufficient time to effect a total decomposition of the polysilicon compound to silica. In other words, if the polysilicon compound is heated to the 300° C. – 375° C. level within about one day, the possibility of ultimate carbon formation will be substantially eliminated.

Any prefabricated, solid, porous refractory structure, for example, bricks, crucibles, and the like, may be treated in accordance with this invention provided, of course, and, as will be readily apparent to those skilled in the art, that the composition of the refractory structure is not detrimentally influenced by the ultimate presence of impregnated amorphous silica formed in the pores during the decomposition. Exemplary of the prefabricated refractory structures which may be so treated are: high heat duty fire brick, super-duty fire brick, high alumina fire bricks, kaolin fire bricks, bonded mullite fire bricks, zircon fire bricks, silica fire bricks, recrystallized silicon carbide fire bricks, fused alumina fire bricks, chrome fire bricks, magnesite (burned) fire bricks, magnesite (unburned) fire bricks, forsterite fire bricks, and other like structurally stable refractories, especially silica brick compositions as classified under ASTM Designation C–416–60. Refractory structures which are advantageously densified and treated in accordance with this invention will contain at least about 95 percent $SiO_2$.

Specific refractory bricks which are advantageously treated in accordance with this invention to increase their resistance to molten glass penetration are composed of at least 99 percent fused silica, have a density of about 1.7 to 2.0 and a porosity of about 8–20 percent, the modules of rupture generally being about 1000–3500 p.s.i. and the compressive strength being about 10,000 to 20,000 p.s.i. These bricks are generally manufactured in a method well known in the art by casting a fine fused silica slip, drying and then kiln-firing and are commercially available. One such suitable brick is that sold commercially by Glasrock Products, Inc.

It is known in the prior art that ethyl silicate may be employed as a binder or glue for holding particulate refractory materials together in the wet production and fabrication of a refractory substance. See, for example, U.S. Pat. No. 2,799,693. The refractory substances produced by this type of prior art technique are highly porous and subject to destruction by the internal penetration of molten, refractory-destroying materials. Consequently, they are exemplary of the prefabricated porous refractory structures which may be further treated in accordance with this invention to densify same and reduce the porosity thereof, thereby producing a new refractory structure which is impregnated with amorphous silica and which has increased resistance to the internal penetration of molten, refractory-destroying materials. In short, the refractory substances produced by this type of prior art are generally characterized by large intercommunicating pores. By treatment in accordance with this invention, the pores' size and their intercommunication is greatly reduced by the silica impregnation.

The following embodiments illustrate the manner of making and using this invention. It is to be understood, however, that these embodiments are merely exemplary and are not to be construed as limiting the invention.

EXAMPLE I (A) Forming Hydrolyzed and Partially Condensed Ethyl Silicate

Four moles (832 grams) of distilled ethyl orthosilicate (tetraethoxysilane) were added to a reactor and 540 grams of anhydrous isopropanol then added to the ethyl silicate. The resultant mixture was agitated for several minutes. To this mixture there was then added 7.2 moles (130 grams) of water. The water addition is generally done slowly and preferably the addition will be successively made in small aliquots until the total water charge has been added. The water was added in 10 ml. aliquots and, after each addition, the mixture stirred until clear; this procedure was successively repeated until the entire charge of water had been added. HCl (1 N solution) was then added to this ethyl silicate-isopropanol-water mixture such that there was a concentration of 10 parts HCl per million parts of total water and ethyl orthosilicate.

The above mixture was then subjected to a hydrolysis and partial condensation by heating the mixture to about 50° to 60° C. to generally effect hydrolysis and then refluxing the mixture for about 2 hours at about 80° C. to effect partial condensation. The resultant solution containing a hydrolyzed and partially condensed polysilicon reaction product was then concentrated by evaporatory removal, at about 80° C., of about 750 grams of the alcohol by-product and water. Thus, there remained a gel-free hydrolyzed and condensed ethyl silicate polymer in an alcoholic solution, the solution containing the equivalent of about 30 to 35 weight percent of silica ($SiO_2$). This solution was then stored in an enclosed glass receptacle and allowed to cool to room temperature.

(B) Densification and Impregnation

A commercially available silica refractory brick was then impregnated according to the following general procedure. The specific brick which was employed was that manufactured and commercially supplied by Glasrock Products, Inc., of Atlanta, Ga., under the name "Masrock." This brick is composed of approximately 99+% fused silica and is generally recognized as having excellent resistance to the corrosive and erosive action of molten glass compositions. A large brick was cut to an acceptable size and the specific brick sample employed was a generally rectangular brick having an initial density of 1.82 grams per cc, a porosity of 17.6 percent, and a size of 1 inch × 1 inch × 3 inches. By microscopic investigation, this sample was characterized by intercommunicating pores of a nominal size of about 50 to 100 microns.

It should be mentioned that the porosity and density of the brick employed were measured according to well known procedures which include ascertaining a dry weight, a saturated weight, and a suspended weight. The dry weight of the brick sample was obtained by weighing the brick after it had been heated to 400° C. and then cooled to room temperature in a dessicator. The so-called saturated weight of the brick is obtained by first boiling it in water for approximately five hours and then immediately weighing the wet brick. The suspended weight is the weight of a dry brick when suspended in water at a temperature of about 25° C. Since density is defined as weight or mass per unit volume, the density of the brick is obtained by dividing the dry weight by the difference between the saturated weight and the suspended weight. Likewise, the porosity is obtained by dividing the difference between the saturated weight and dry weight by the difference between the saturated weight and the suspended weight. The 1 inch × 1 inch × 3 inch sample when tested according to the above procedures had a porosity of 17.6 percent and density of 1.82 grams per cc as indicated above. The silica refractory brick sample while at room temperature was then immersed in the solution produced according to Step A above and allowed to remain and soak in this solution overnight to become thoroughly impregnated and saturated. This was done in the ambient environment. The saturated brick sample was then removed and the excess alcoholic solvent was allowed to evaporate therefrom by setting in open air until a brick sample with a substantially dry appearance resulted. The brick sample, which is now impregnated with the decomposable polysilicon compound, was then heated to about 325° C. to about 350° C. in an air environment within a period of about 1½ hours to 3 hours and held at that temperature for approximately 3 to 4 hours. After this heating cycle, the sample was again heated, this time to a temperature of about 550° C. to 600° C. and held there for several hours to effect a final decomposition of the hydrolyzed ethyl silicate polymer. As a result of this decomposition, amorphous silica was deposited in the brick pores, thus producing a silica impregnated brick.

A highly beneficial feature of this invention is that the silica was deposited, apparently without the formation of any residual carbon as determined by chemical analysis. Since carbon is known to discolor certain glass compositions as well as set up undesirable electro-chemical reactions, this carbon-free silica impregnation makes the bricks well suited for use in the glass melting operation.

The density of the silica impregnated brick after this first treatment was then determined according to the procedure hereinbefore set forth and found to be 1.87; that is, a densification of 3.01 percent resulted. Likewise, the porosity was determined and found to be 15.1 percent, which is the equivalent of a pore reduction of 14.2 percent. When microscopically examined, it was found that the silica impregnated brick had silica deposited in a uniform and homogeneous manner throughout the entire thickness of the brick which is attributable to the solution treatment and soaking. The pre-treatment pore inter-communication was also substantially reduced.

The silica impregnated brick which had been treated as set forth above was then successively treated five additional times according to the same procedure. Table I below summarizes the resultant densification and pore reduction of this brick after each of these successive treatments.

TABLE I

| Densification and Pore Reduction of Example I | | | | | | | |
|---|---|---|---|---|---|---|---|
| | Before treatment | First treatment | Second treatment | Third treatment | Fourth treatment | Fifth treatment | Sixth treatment |
| Density (grams per cc) | 1.82 | 1.87 | 1.90 | 1.92 | 1.93 | 1.93 | 1.94 |
| Porosity (percent) | 17.6 | 15.1 | 13.6 | 12.4 | 12.3 | 12.2 | 11.9 |
| Densification (percent) | 0 | 3.01 | 4.8 | 6.1 | 6.4 | 6.6 | 6.9 |
| Pore reduction (percent) | 0 | 14.2 | 22.6 | 28.8 | 30.1 | 31.0 | 32.4 |

EXAMPLE II

The procedure of Example I was repeated to the extent that the brick was subjected to three successive, silica impregnation treatments, thereby producing a carbon-free silica impregnated brick having a density of about 1.92 grams per cc and a porosity of about 12.4 percent. This treated brick sample and an untreated brick sample of the same dimensions were then suspended in identical molten pools of a normally corrosive lithia-alumina-silica glass and held there for several days. After this period, the samples were removed and compared for their resistance to the corrosive and erosive action of the molten lithia-alumina-silicate glass.

Upon removal, the attack of the molten glass upon the untreated sample was clearly evident because of the substantial size reduction of the sample as well as a substantial distortion of shape, including a rounding of the edges and sides of the brick. A cross-sectional cut was then made through the untreated brick and, under a magnification, it was noted that the internal pores were filled with glass. These glass filled pores thus indicate a substantial glass-refractory brick contact area which tends to increase the rate of internal refractory brick destruction. Additionally, it was noted that there was a substantial occurrence of glass-filled pores in the untreated brick having diameters of approximately 1/16 inch; this indicated that the pore size actually increased during contact with the molten glass because prior to suspension into the molten glass, the pore size of the untreated brick was generally in the 50–100 micron range. A visual inspection of the molten glass, after cooling, in the general vicinity where the untreated brick had been previously immersed showed a substantial occurrence of seeds.

The silica impregnated brick was then evaluated for its properties. An attack of this sample by the molten glass was not evident since there was no substantial distortion in the brick shape nor was there any size reduction. A cross-sectional cut of the silica impregnated brick, under magnification, showed that no glass had penetrated into the internal pores of the brick. No increase in the pore size was observed. Additionally, the number of seeds in the cooled molten glass in the general vicinity where the silica impregnated brick had been immersed was substantially and significantly less than the number of seeds observed in the glass where the untreated brick sample was immersed.

In passing, it will be noted that the treated refractory brick sample had its porosity decreased by about 29 percent. One skilled in the art would logically assume, therefore, that glass penetration would be decreased only by 29 percent. However, this was not the case since virtually no glass penetration took place. This is believed to be the result of an unexpected and significant change in the nature of the pores' microstructure.

Thus, it will be clearly evident from the above that the impregnated brick produced according to the teachings of this invention showed significant improvement with regard to its resistance to the corrosive and erosive action of molten glass.

EXAMPLE III

The procedure of Example I was generally repeated with two modifications. Instead of using the fused silica refractory brick sample of that example, other commercially available solid, porous insulating fire bricks composed of silicon and alumina were used. Additionally, instead of allowing the samples to soak in the solution while in the ambient environment, the soaking was done in a vacuum of about 27 inches Hg. The tables below summarize the density, porosity, densification and pore reduction of the fire bricks after each of the treatments. As will be readily apparent from these tables, the density of these samples may be increased by as much as 125 percent or even more and the porosity decreased by as much as 59 percent or more.

While the bricks used in this example are insulating bricks wherein a relatively high porosity is desirable, the example does show the significant density increase and porosity decrease which can be effected in accordance with this invention.

EXAMPLE IV

Several hydrolyzed and partially condensed polysilicon compounds which are decomposable to pure silica

TABLE II

| | Insulating Fire Brick A | | | | | | |
|---|---|---|---|---|---|---|---|
| | Before treatment | First treatment | Second treatment | Third treatment | Fourth treatment | Fifth treatment | Sixth treatment |
| Density (grams per cc.) | .74 | 1.04 | 1.26 | 1.42 | 1.53 | 1.61 | 1.68 |
| Porosity (percent) | 72.3 | 58.9 | 48.7 | 41.6 | 36.6 | 33.0 | 29.9 |
| Densification (percent) | 0 | 40.0 | 70.8 | 91.0 | 105.7 | 116.5 | 125.0 |
| Pore reduction (percent) | 0 | 18.6 | 32.7 | 42.5 | 49.4 | 54.4 | 58.6 |

TABLE III

| | Insulating Fire Brick B | | | | | | |
|---|---|---|---|---|---|---|---|
| | Before treatment | First treatment | Second treatment | Third treatment | Fourth treatment | Fifth treatment | Sixth treatment |
| Density (grams per cc.) | 1.13 | 1.38 | 1.57 | 1.70 | 1.78 | 1.83 | 1.88 |
| Porosity (percent) | 64.7 | 53.2 | 44.8 | 39.1 | 35.4 | 33.1 | 30.7 |
| Densification (percent) | 0 | 22.2 | 38.7 | 49.8 | 56.9 | 61.6 | 66.0 |
| Pore reduction (percent) | 0 | 17.8 | 30.8 | 39.6 | 45.3 | 48.9 | 52.5 | were prepared according to the general procedure of Example I-A. Everything was kept constant for each of the present reactions except the molar ratio of water to tetraethoxysilane. In Example I-A this molar ratio was about 1.8 to 1 whereas in the present runs, this ratio was varied from 0.5 to about 3.0 to 1.

Thus, the general procedure comprised: (a) heating a mixture of four moles (832 grams) of distilled tetraethoxysilane (tetra ethyl orthosilicate), 540 grams of anhydrous isopropanol, water and 10 parts per million HCl, to about 60° C. and then refluxing the mixture for two hours (b) concentrating the resulting solution by vaporizing sufficient amounts of the solvent to produce a solution containing 35 percent by weight of theoretical equivalent silica. Since tetraethoxysilane has a theoretical equivalent silica content of about 28.8 percent, this means the solution theoretically contains about 240 grams of equivalent silica. Consequently, concentration was done until there remained about 687 grams of solution.

After these solutions of a hydrolyzed and condensed ethyl silicate were obtained, equal aliquots thereof were allowed to set in the open air until all the solvent evaporated and then the residual decomposable compounds were totally decomposed to silica by heating in a 600° C. furnace.

The amount of silica obtained by this technique was then compared against the theoretical obtainable silica and the actual yield determined. Table IV below summarizes the results.

TABLE IV

| Molar Ratio of Water to Tetraethoxysilane | Yield of SiO$_2$ in % of Theoretical Recovery |
|---|---|
| 0.5 | 40 |
| 1.0 | 74 |
| 1.5 | 99+ |
| 1.8 | 99+ |
| 2.0 | 99+ |
| 2.25 | 99+ |
| 2.5 | 99+ |
| 3.0 | 99+ |

It will thus be seen that below molar ratios of about 1.5 to 1 low yields of silica are obtained relative to the nearly 100 percent yield obtained by using molar ratios in excess of about 1.5:1. A tendency of the 35 percent solutions to gel after setting for extended periods in stoppered receptacles was noted for those runs in which the molar ratio of water to tetraethoxysilane exceeded 2.25 to 1.

EXAMPLE V

A commercially available hydrolyzed and condensed ethyl silicate polymer which contained about 40 percent equivalent silica was added to anhydrous ethanol to produce a gel-free solution having a concentration of about 33 percent by weight equivalent silica. This solution was then used in lieu of the solution prepared in Example I-A, and the procedures of Examples I-A, II and III repeated. In all cases, the results were substantially identical to those set forth in these examples.

EXAMPLE VI

The procedure of Example I was followed except only a single treatment was employed and the heating of the brick sample to decompose the polysilicon compound to silica was modified. In this instance the impregnated brick sample was held at a temperature of about 180° C. for 1½ days and then, within about two hours, heated to 550° C. and held there until the decomposition to silica was complete. Carbon presence was apparent by visual observation and, by chemical analysis, the silica residue was shown to contain 1.5 – 2% carbon.

EXAMPLE VII

The following procedure was employed to determine the effectiveness of brick densification and pore reduction by impregnating the brick with silica from a colloidal dispersion (See U.S. Pat. No. 3,236,665). These types of dispersions are variously referred to in the arts as physical solutions, sols, emulsions, or suspensoids and are distinguished from a true solution because they have solids suspended or dispersed in a dispersing medium.

Finely divided commercially available silica having a particle size of .015 – .020 micron was then used to prepare an aqueous colloidal silica containing 30 percent by weight SiO$_2$; the colloidal silica being prepared by adding the finely divided silica to water containing a trace of NH$_3$ as a stabilizer followed by vigorous agitation. This produced a thick, pasty-consistency product. One side of a brick sample like that of Example 1, that is, a brick composed of 99+ percent fused silica having a density of about 1.82 grams per cc and a porosity of about 17.6 percent, was kept in contact with the above produced pasty-consistency colloidal silica composition for about two hours. After this, drying of the brick was effected and the brick examined for impregnation. The treated side of the brick showed no internal impregnation with silica. Only a very loosely adhered surface layer of SiO$_2$ remained.

The foregoing thus indicates that, for some unknown reason, colloidal silica will not effectively impregnate or penetrate the refractory throughout its entire thickness.

EXAMPLE VIII

A commercially available hydrolyzed and condensed ethyl silicate which contained about 40 percent equivalent silica was added to anhydrous ethanol to produce a gel-free solution having a final concentration of about 33 percent by weight of equivalent silica. Into this solution there was then placed a prefabricated 1 lb. solid porous crucible (containing about 96 percent fused silica and being manufactured by a slip-casting technique) and the crucible allowed to set and remain in this solution for a period of about 18 hours. The crucible was then removed and allowed to set in the ambient environment for a sufficient time for the ethanol solvent to evaporate, thus producing a crucible which had been impregnated throughout its entire thickness with a decomposable, hydrolyzed and condensed ethyl silicate polymer. The polymer was then decomposed to silica by heating the crucible in air according to the following schedule: heating to about 325° C. within a period of about five hours, holding that temperature level for about five hours and then heating the crucible to about 600° C. and holding the latter temperature level for a sufficient amount of time to effect a total decomposition to silica. After this treatment, the identical procedure was repeated two more times to further densify the crucible and reduce the porosity thereof.

An identical lithia-alumina-silica glass batch composition was placed in the crucible as treated above and in an identical untreated crucible. These compositions were then melted and cooled under identical conditions. It was found, after cooling, that the glass produced in the treated crucible contained a substantially smaller number of seeds than did the glass manufactured in the untreated crucible. Thus, the above indicates that the bleeding tendency of a porous crucible is greatly decreased by its having been impregnated with amorphous silica according to the procedure of this invention.

According to one feature of this invention, the refractory structure, which is impregnated with and has had the decomposable polysilicon compound deposited throughout the entire thickness thereof, may be employed according to well known procedures in a newly fabricated or refabricated melting furnace as a wall or floor component which ultimately will be in contact with molten glass, and the decomposition of the decomposable polysilicon compound to silica is effected during heat-up of the melting furnace.

As indicated hereinbefore, in certain instances it may be desirable to employ successive treatments to produce a higher degree of silica impregnation. Thus, in this case, the solution treatment is first employed to impregnate the refractory structure throughout its entire thickness with the decomposable polysilicon compound and the compound is then decomposed by heating to procude a silica impregnated refractory structure; this silica-impregnated refractory structure may then again be successively subjected to the same procedure, to effect further silica impregnation, followed by the hereinafter described operation or it may immediately be so used without repeating the same procedure. The refractory structure having silica impregnated throughout its entire thickness is then again impregnated by solution treatment with the polysilicon compound, thereby producing a refractory structure which is impregnated throughout its entire thickness with a mixture of both silica and the polysilicon compound which is decomposable to silica; the presence of the latter compound being attributable to the immediately preceding solution treatment and the presence of the former to the preceding decomposition step. The mixture-impregnated refractory structure, after drying to remove the solvent of the solution, is then employed in the fabrication of a melting furnace as a component thereof which will be in ultimate contact with molten glass and the final decomposition of the polysilicon compound to silica effected during heat-up of the furnace. Since these silica impregnated bricks have improved resistance to the destructive action of molten, refractory destroying glass compositions, a furnace constructed of these bricks has an improved useful life.

As used in the appended claims, the term "molten glass contacting location" means a location, whether as part of a furnace wall, floor, lining or the like, in a newly constructed, reconstructed or rebuilt glass melting furnace which, when the furnace is in operation, will be in contact with a pool of molten glass. Obviously, the term "melting furnace" includes not only the melter per se, but also appendant auxiliaries such as the refiner, forehearth, feeder bowl and the like. Similarly, the term "glass" is intended to comprehend not only vitreous compositions but also devitrifiable compositions.

While the invention has been described above with particularity, it will, of course, be apparent that modifications may be made which, pursuant to the patent statutes and laws, do not depart from the spirit and scope of the invention.

I claim:

1. In a method which comprises positioning a plurality of solid, porous, structurally stable silica refractory bricks, having a porosity of about 8 to about 20 percent and a density of about 1.7 to 2 grams per cubic centimeter, in a glass melting furnace at a molten glass contacting location therein and heating said furnace to its normal operating temperature to melt glass, the improvement which comprises increasing the resistance of said silica refractory bricks to the corrosive and errosive action of molten glass by saturating said silica refractory bricks prior to said positioning into the furnace with a substantially gel-free solution consisting essentially of a hydrolyzed and condensed compound of the formula $SiX_4$ wherein X is a halide or an OR group in which R is an alkyl or aryl group of less than about 8 carbon atoms, evaporating the solvent of said solution and heating said hydrolyzed and condensed compound and said bricks to a temperature of about 300°C to about 375°C within a period of time not to exceed about one day, maintaining a temperature of about 300°C to 375°C for at least about 3 hours and heating to at least about 500°C and holding said temperature for a sufficient time to effect s substantially total decomposition of said compound to silica, and to impregnate said brick throughout its entire thickness with silica thereby decreasing the porosity and increasing the density of said silica refractory brick.

2. The improvement of claim 1 wherein X is an OR group with R being an alkyl of one to eight carbon atoms.

3. The improvement of claim 2 wherein said polysilicon compound is a hydrolyzed and condensed ethyl silicate polymer.

4. In a method which comprises positioning a plurality of solid, porous, structurally-stable silica refractory bricks having a porosity of about 8 to about 20 percent and a density of about 1.7 to 2 grams per cubic centimeter in a glass melting furnace at a molten glass contacting location therein and heating said furnace to its normal operating temperature to melt glass, the improvement which comprises increasing the resistance of said refractory bricks to the corrosive and errosive action of molten glass by introducing into the pores of said bricks throughout their entire thickness a substantially gel-free solution consisting essentially of a hydrolyzed and condensed compound of the formula $SiX_4$ wherein X is a halide or an OR group in which R is an alkyl or aryl group of less than about 8 carbon atoms, said introduction being prior to positioning said bricks in said melting furnace, and further wherein said hydrolyzed and condensed compound is heated during said heating of said furnace to its normal operating temperature as follows: heating to a temperature of about 300°C to about 375°C within a period of time not to exceed about one day, maintaining a temperature of about 300°C to 375°C for at least about 3 hours and heating to at least about 500°C and holding this temperature for a sufficient time to effect a decomposition of said compound to silica and thereby deposit silica into the pores of said bricks substantially throughout its entire thickness and increase the porosity in density of said bricks.

5. The improvement of claim 4 wherein said compound is ethyl silicate.

* * * * *

UNITED STATES PATENT OFFICE
CERTIFICATE OF CORRECTION

Patent No. 3,816,163          Dated June 11, 1974

Inventor(s) Bulent E. Yoldas

It is certified that error appears in the above-identified patent and that said Letters Patent are hereby corrected as shown below:

On the title page in column 2 "... no drawing" should read -- Drawing, One sheet --.

Column 3, line 62 "reacton" should read -- reaction --.

Table 1, in column 9 and 10, and Tables 2 and 3, in columns 11 and 12, the word -- after -- should appear before "first", "second", "third", fourth", "fifth", and "sixth", respectively.

Add the attached drawing.

Signed and sealed this 13th day of May 1975.

(SEAL)
Attest:

RUTH C. MASON
Attesting Officer

C. MARSHALL DANN
Commissioner of Patents
and Trademarks